United States Patent
Trasforini

(10) Patent No.: US 10,258,139 B2
(45) Date of Patent: Apr. 16, 2019

(54) MECHANICAL PROCESSING TOOL, AND PROCESS AND EQUIPMENT FOR MAKING A MECHANICAL PROCESSING TOOL

(71) Applicant: Daniele Trasforini, Calderara di Reno (Bologna) (IT)

(72) Inventor: Daniele Trasforini, Calderara di Reno (IT)

(73) Assignees: Daniele Trasforini, Bologna (IT); Felton Brushes Limited, Hamilton, Ontario (CA)

( * ) Notice: Subject to any disclaimer, the term of this patent is extended or adjusted under 35 U.S.C. 154(b) by 335 days.

(21) Appl. No.: 14/910,019

(22) PCT Filed: Aug. 5, 2014

(86) PCT No.: PCT/IB2014/063699
§ 371 (c)(1),
(2) Date: Feb. 4, 2016

(87) PCT Pub. No.: WO2015/019279
PCT Pub. Date: Feb. 12, 2015

(65) Prior Publication Data
US 2016/0174697 A1 Jun. 23, 2016

(30) Foreign Application Priority Data
Aug. 6, 2013 (IT) .............................. BO2013A0443

(51) Int. Cl.
*A46B 3/04* (2006.01)
*B29C 45/14* (2006.01)
(Continued)

(52) U.S. Cl.
CPC .......... *A46B 3/04* (2013.01); *B29C 45/14065* (2013.01); *B29C 45/14385* (2013.01);
(Continued)

(58) Field of Classification Search
CPC .. A46B 3/04; A46B 3/005; A46B 3/20; A46B 2200/3093; A46B 13/16; B29C 45/14385; B29C 45/14065
(Continued)

(56) References Cited

U.S. PATENT DOCUMENTS

| 5,755,033 A | 5/1998 | Gunter et al. |
| 6,173,470 B1 | 1/2001 | van Osenbruggen |
| 2002/0065031 A1* | 5/2002 | Chou .................. A46B 13/001 451/466 |

FOREIGN PATENT DOCUMENTS

| TW | 201116369 A | 5/2011 |
| WO | 2010031849 A1 | 3/2010 |

OTHER PUBLICATIONS

International Search Report and Written Opinion dated Dec. 12, 2014, for International Patent Application No. PCT/IB2014/063699.
(Continued)

Primary Examiner — Laura C Guidotti
(74) Attorney, Agent, or Firm — John H. Thomas, P.C.

(57) ABSTRACT

A tool for mechanical processing, preferably a brush, comprises a tool body, a plurality of filaments having a first portion anchored to the tool body and a second portion designed to apply a brushing action when the body is rotated about its axis, wherein the body comprises a retaining portion defining the body and made from a binder material in which the first portion of the filaments is embedded and incorporated to make it integral with the body. The body has a plurality of windows designed to improve the heat exchange of the first portion of the filaments with the environment during the rotation of the brush at high speeds so as to reduce the temperature.

7 Claims, 3 Drawing Sheets

(51) Int. Cl.
    *A46B 15/00*         (2006.01)
    *B29K 75/00*         (2006.01)

(52) U.S. Cl.
    CPC ....... *A46B 15/00* (2013.01); *A46B 2200/3093* (2013.01); *B29K 2075/00* (2013.01)

(58) Field of Classification Search
    USPC .................. 451/488, 259; 15/207.2; 300/21
    See application file for complete search history.

(56) References Cited

OTHER PUBLICATIONS

European Patent Office Notification of Intention to Grant a patent and related prosecution, dated Jan. 24, 2018, 14 pages.
China Notification to Grant Patent Right and related prosecution, dated Apr. 25, 2017, 4 pages.

\* cited by examiner

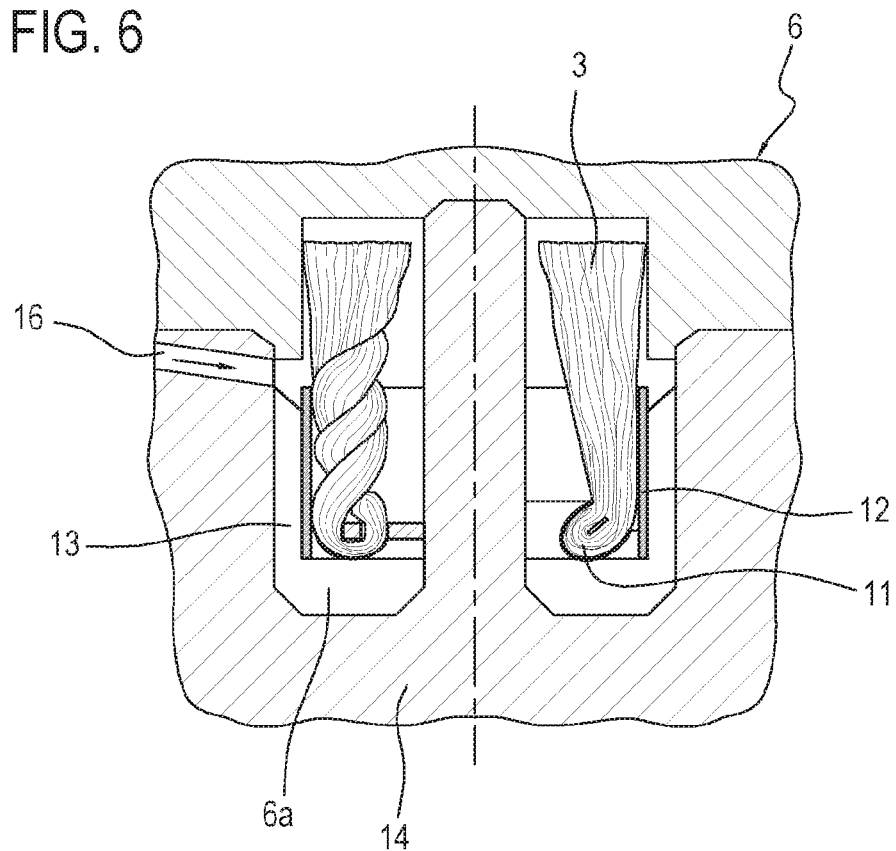

MECHANICAL PROCESSING TOOL, AND PROCESS AND EQUIPMENT FOR MAKING A MECHANICAL PROCESSING TOOL

CROSS-REFERENCE TO RELATED APPLICATIONS

This is a National Stage Entry into the United States Patent and Trademark Office from International PCT Patent Application No. PCT/IB2014/063699 having an international filing date of Aug. 8, 2014, and Italian Patent No. BO2013A000443 filed Aug. 6, 2013, both of the contents of which are incorporated herein by reference.

TECHNICAL FIELD

This invention relates to a mechanical processing tool, and to a process and equipment for making the mechanical processing tool.

More specifically, this invention relates to an industrial or hobby brush and to a process and equipment for making the brush.

This invention is therefore applicable in particular in the sector of industrial and hobby brushes, that is to say, brushes used for mechanical processes (for example, to remove burrs or to abrade surfaces) or to obtain a seal finish (airtight, dust tight, etc.) for industrial applications and for hobby applications (that is, in a private context, for domestic use).

BACKGROUND ART

Tools available on the market come in the following categories:
cup brushes
circular brushes
miscellaneous types for hobby applications
linear brushes (known as "strip brushes") for miscellaneous applications.

In this context, a prior art brush typically comprises a brush body and a plurality of filaments having a first portion mechanically anchored to the brush body and a second portion designed to apply a brushing action when the brush body is rotated about its axis, or used as retaining elements.

As regards the "active" portion of the brush, that is, the filaments, these are normally wound around rings and may be metal filaments (that is, twisted tufts or crimped wire), synthetic filaments (straight or crimped) and natural filaments (horsehair and so on).

In twisted tuft brushes (with metal wires), the filaments are grouped in tufts and then twisted. Each tuft is associated with a hole made on the flange in the proximity of its outer circumference.

In crimped filament rings, the flange is called ferrule and acts in conjunction with a metal mounting ring around which the filaments are bent in the shape of U. To hold the filaments correctly in place, the ferrule is beaded on its cylindrical part.

Thus, the ferrule and the metal mounting ring (generally a metal ring) "grip" the filaments folded into a U shape and distributed all around the inner circumference of the mounting ring.

In the manufacture of a cup brush with crimped filaments, four elements are usually assembled, namely, an inner cup, an outer cup and a reducer (or clamping element) which by shaping the end of the reducer draws the ring with the filaments closer to the other elements packing them together to form a single body.

In some prior art brushes, the process ends by embedding the tool (by casting or injection moulding) partly or totally in a plastic material, usually polyurethane, plastic resins or the like.

In this production method, all the metal components forming part of the brush (flanges, cups, etc) are internally coated totally or partly by the plastic material or only the ring with the metal filaments is embedded in the plastic.

It should be noted that up to the present, this process has been applied only to brushes with metal filaments for the following reasons:
 safety, because the filaments do not reach breaking point during brushing operations;
 brushing efficacy, because the brushes are kept as far as possible in a straight position making their brushing action more effective.

All the brushes currently made according to this production system have several drawbacks.

In effect, brushes made in this way tend to produce a high concentration of heat at the brush body, that is, in the part opposite to the active filament portion. In the case of brush bodies made entirely of plastic, this heat leads to quick deterioration of the properties of the plastic matrix, causing the plastic to crumble and the filaments to break quickly (because they are not held properly in place by the plastic).

Moreover, this excessive heating also creates the risk of contaminating the brushed surface.

Furthermore, current brushes with synthetic filaments with abrasive powders not totally embedded in plastic materials have the drawback that they lose the abrasive powder during brushing, causing rapid wear of the moving mechanical parts.

DISCLOSURE OF THE INVENTION

In this context, the basic purpose of this invention is to provide a mechanical processing tool and a process and equipment for making the mechanical processing tool which overcome the above mentioned disadvantages of the prior art.

More specifically, this invention has for an aim to provide a mechanical processing tool and a process and equipment for making the mechanical processing tool which are simple in construction and which allow reducing production costs while guaranteeing a high level of robustness even in use at high speeds of rotation.

More specifically, this aim is achieved by a tool for mechanical processing, comprising a main body, a plurality of filaments, having a first portion anchored to the main body and a second portion designed to apply a brushing action when the brush body is rotated about its axis, wherein the brush body comprises a binding portion defining an outer shell of the brush body itself and made from a binder material in which the first portion of the filaments is embedded and incorporated to make it integral with the brush body.

According to the invention, the binding portion has a plurality of (pass-through) windows designed to improve the heat exchange of the first portion of the filaments with the surrounding environment during the rotation of the tool at high speeds so as to reduce the rate of temperature increase in the main body.

Advantageously, the presence of the windows allows considerably increasing the rate of heat dispersion, preventing heat from accumulating in the plastic layer (the binding portion being a poor heat conductor) and causing it to be dispersed in air by convection.

It should be noted that the term "pass-through" is used to also include the case where a window, after moulding, is occluded by a thin layer of plastic material.

Preferably, the mechanical processing tool according to this invention is an industrial brush or a hobby brush.

In a first embodiment, the first portion of the filaments partly faces the outside of the shell through the plurality of windows.

Preferably, however, especially in cup brushes, it comprises a ring incorporated in the binding portion and positioned around the first portion of the filaments in such a way as to clamp them.

The ring, therefore, partly faces the outside of the shell through the plurality of windows in order to improve heat exchange during rotation of the brush at high speeds.

In some embodiments, the binding portion extends along and incorporates the second portion of the filaments and has one or more further (pass-through) windows located in such a way as to make the second portion of the filaments accessible from the outside so as to improve heat exchange during the rotation of the tool (that is, of the brush) at high speeds.

In other words, the second filament portion, too, is surrounded by, and preferably incorporated in, a plastic layer, so as to reduce the "bellying" of the filaments but has one or more further windows which prevent it from overheating.

In the embodiment illustrated, the tool has a further pass-through window extending in helical fashion from a free end of the second filament portion towards the brush body.

It should be noted that the filaments, embedded in the main body (which may generically be of one of the four categories described above) are made of metal, synthetic material or natural material. They may be with or without abrasive powder.

The main body, that is, the binding portion, on the other hand, is made of a plastic material selected (to obtain brush bodies of different hardness) preferably from the following list:
  polyurethane,
  a thermoplastic material,
  an elastomer,
  a silicone,
  natural rubber.

This invention also has for an object a method for making the tool (that is, the brush).

The method comprises a first step of preparing a mould (or, two half-moulds, at least one of which is movable towards the other) forming internally of it a moulding chamber designed to receive a liquid.

The mould is thus provided with at least one feed conduit in which the liquid (binder material in the liquid state) is made to flow.

Next, a plurality of filaments is placed inside the mould in such a way that at least a first portion of the filaments is positioned in the moulding chamber and a binder material in the liquid state is introduced into the moulding chamber in such a way that at least the first portion of the filaments is immersed in the binder material.

Next, the binder material is allowed to solidify to form the binding portion, incorporating at least the first portion of the filaments to constitute a rigid main body (or brush body) in which the first portion of the filaments is embedded (and incorporated).

According to the invention, the step of preparing the mould comprises at least a step for preparing a plurality of inserts anchored to a wall of the chamber and configured for defining, at the end of the solidifying step, a corresponding plurality of pass-through windows designed to improve the heat exchange of the first filament portion with the environment during the rotation of the brush at high speeds so as to reduce the temperature. Thus, the pass-through windows are shaped to match the inserts.

Preferably, the step of preparing a plurality of filaments is performed by positioning the first portion of the filaments in such a way that the inserts define a radial abutment for the selfsame first portion.

Advantageously, that way, the inserts define gripping members for the filaments so that the binder material can be fed in by injection under pressure without displacing the filaments by effect of the pressure and density of the injected material.

In some embodiments, the inserts are usually placed in contact with the first (or the second) filament portion.

These inserts may vary in geometrical shape, thickness and extension relative to their position on the outside or inside lateral surface of the brush body.

Alternatively, the inserts are placed in contact with a filament retaining ring.

In that case, before the step of introducing the liquid, the method therefore comprises placing a ring around the first filament portion inside the chamber so the filaments can be clamped tight.

The inserts are thus placed in abutment against the ring (externally thereof) so as to define, at the end of the solidifying step, the plurality of pass-through windows.

Thus, after solidification, the ring is visible from the outside of the brush through the windows.

It should be noted that in cup or tapered brushes, the plurality of filaments is positioned in such a way as to form an annular coil.

According to one aspect of the invention, the inserts are anchored to a lateral wall of the chamber to form a radial abutment outside the annular coil. Thus, the inserts are positioned externally of the annular coil.

Alternatively, or in addition, the mould may comprise a central pin defining, in use, a channel for reducing the brush.

In that case, the annular coil is substantially coaxial with the pin.

In one embodiment, the inserts are anchored to the pin to form a radial abutment inside the annular coil. Thus, the inserts are interposed between the pin and the coil to form the windows in a zone of the retaining portion inside the coil.

This method is preferably implemented by equipment which also forms an object of this invention.

The equipment comprises the mould forming the moulding chamber internally of it and equipped with at least one feed conduit leading into the moulding chamber and is characterized in that it comprises a plurality of inserts anchored to a wall (lateral or pin) of the chamber and positioned in such a way as to form a radial abutment for a portion of the filaments to be positioned inside the chamber so as to form, in the brush, a plurality of windows designed to improve the heat exchange of the filaments with the environment during the rotation of the brush at high speeds.

BRIEF DESCRIPTION OF THE DRAWINGS

Further features and advantages of the present invention are more apparent from the non-limiting description which follows of a preferred, non-limiting embodiment of a brush and a method and equipment for making the brush, as illustrated in the accompanying drawings, in which:

FIG. 6 shows a simplified cross section of the equipment used for making the mechanical processing tool, and more specifically a cup brush, according to the invention.

DETAILED DESCRIPTION OF PREFERRED EMBODIMENTS OF THE INVENTION

With reference to the accompanying drawings, the numeral 1 denotes a mechanical processing tool (that is, a brush) according to this invention. More precisely, in FIGS. 1 and 2 the numeral 1 denotes an industrial cup brush, and in FIGS. 3 and 4, the numeral 1 denotes an industrial circular brush.

Figure 5:
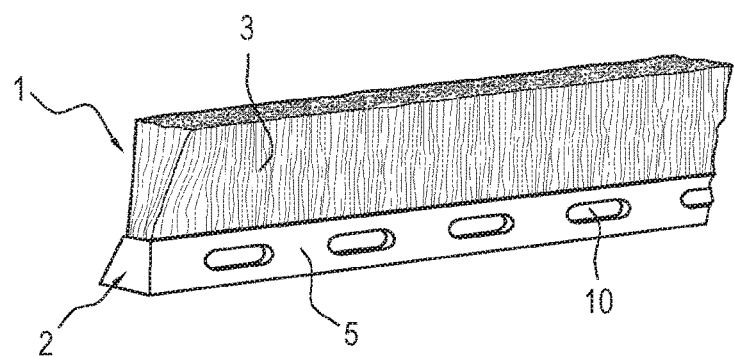
FIG. 5 shows a further embodiment of a tool according to this invention and, more specifically, a strip brush.

In FIG. 5, on the other hand, the numeral 1 denotes a linear brush, more commonly known as "strip brush".

The tool 1, that is, the brush, comprises a main body 2 (that is, a brush body) and a plurality of filaments.

It should be noted that hereinafter reference is often made, without limiting the scope of the invention, to a "brush 1" instead of the more generic "tool" and to a "brush body 2" instead of "main body".

Thus, the brush 1 comprises a brush body 2 and a plurality of filaments 3. The filaments 3 have a first portion 3a anchored to the brush body 2 and a second portion 3b designed to apply a brushing action when the brush 1 (that is, the brush body 2) is rotated about its longitudinal axis 4.

According to the invention, the brush body 2 comprises a retaining portion 5, made from a binder material, in which the first portion 3a of the filaments 3 is immersed (embedded, that is, incorporated).

Thus, the retaining portion 5 incorporates the first portion 3a of the filaments 3 to make it integral with the brush body 2.

The binder material is an originally liquid material which subsequently solidifies around the first portion 3a of the filaments 3 to incorporate them in the solid brush body 2.

Preferably, the retaining portion is a matrix of plastic material.

For example, the retaining portion comprises polyurethane solidified around the first portion 3a of the filaments 3 to form a rigid (but not brittle) block 2 incorporating the first portion 3a of the filaments 3 in order to lock them in place.

Thus, according to the invention, the brush body 2 comprises a rigid block incorporating the filaments and obtained by solidification of a liquid plastic material in a mould 6 (for example by casting or injection moulding).

Figure 1:
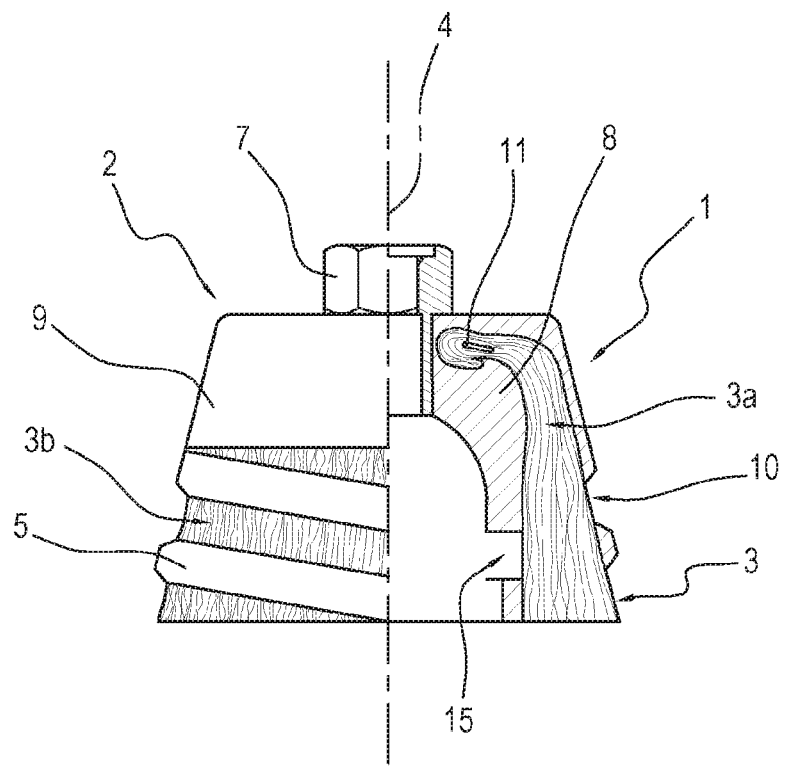
FIG. 1 shows a cross section of a tool according to this invention and, more specifically, a cup brush.

FIG. 1 shows the brush 1 comprising primarily an annular element 11 associated with crimped filaments or twisted tufts comprising a plurality of filaments 3 (metallic or synthetic or natural).

As stated, the filaments 3 are embedded at least partly in the brush body 2, that is, in the retaining portion 5 of plastic material.

According to the invention, the brush body 2 comprises a retaining portion 5 of binder material in which all the elements present (reducer 7, outer cup 9, inner cup 8) are not incorporated externally, but are incorporated internally.

The retaining portion (that is, the binding portion 5) made of plastic material forms the brush body 2 and defines the outer shape thereof.

Of the filaments 3, at least the first portion 3a is embedded in the retaining portion 5.

According to the invention, the main body 2 (or brush body), and more specifically, the retaining portion 5 is equipped with a plurality of (pass-through) windows 10 designed to improve the heat exchange of the first portion 3a of the filaments 3 with the environment during the rotation of the brush at high speeds so as to reduce its temperature.

With reference to FIG. 1, the retaining portion extends along the length of the filaments 3, at least partly incorporating also the second portion 3b both internally and externally.

In this configuration (FIG. 1), the plastic material (that is, the retaining portion 5) extends, as stated, along the outside part opposite to the cup 9 and has a further window 10, helical in shape, where part of the filaments may show through in the zone without the plastic material.

Figure 2:
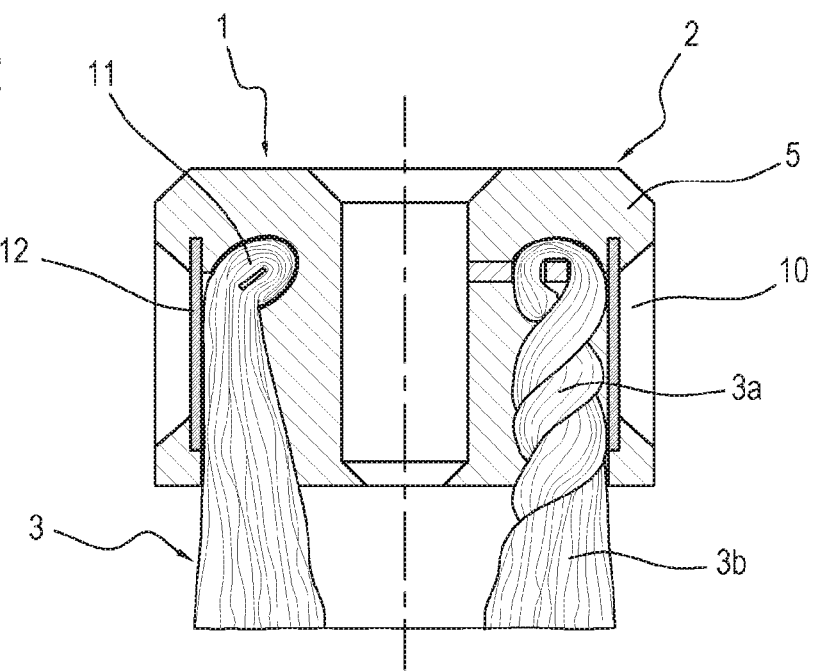
FIG. 2 shows a tool with the filaments partly immersed according to another aspect of the invention.

As may be noted in FIG. 2, there are, in the brush body 2, windows 10 (preferably rectangular in shape) where there is no plastic material.

In this embodiment, the brush 1 (in this case, a cup brush) comprises a reduced number of components, that is, it comprises only the filaments 3 and an outer metal ring 12 which holds them in place. Thus, there is no need for the reducer 7 and for the inner and outer cups 9 and 8.

This is made possible by the solidified binding portion 5, which constitutes the means for partly anchoring the filaments 3 by means of the metal outer ring 12.

In this case, the outer ring 12, which is partly immersed in the binder material, has some rectangular parts which are totally free of plastic so as to disperse heat better, making the threaded coupling which transmits rotational motion to the brush 1 safer against damage.

The ring 12, therefore, partly faces the outside of the shell through the plurality of windows 10 in order to improve heat exchange during rotation of the brush 1 at high speeds.

FIG. 2 shows one of the possible variant embodiments of this invention in the case of a cup brush.

In light of this, the metal parts just of the ring 12 used to hold the filaments 3 in place disperse the heat in optimum manner (heat exchangers).

Figure 3:
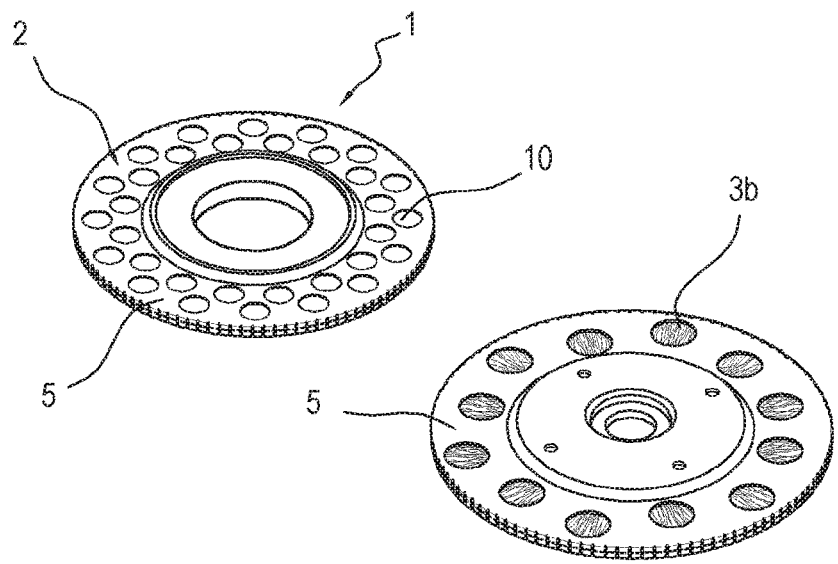
FIG. 3 shows a cross section of a tool according to this invention and, more specifically, a circular brush.

FIG. 3 shows circular brushes where the brush body 2, which keeps together all the components of the brush 1, is provided on the outer part of it with circular windows 10 of suitable diameter and depth and variably spaced on the lateral surface of the disc-shaped brush.

Figure 4:
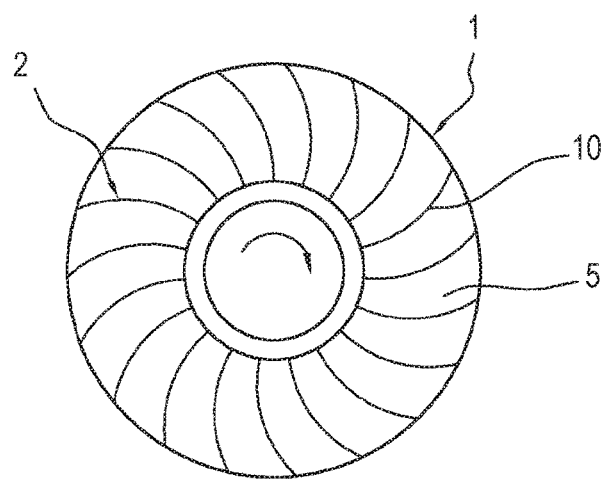
FIG. 4 shows the tool of FIG. 3 according to another aspect of the invention.

FIG. 4 shows another circular brush where the windows 10 in the brush body 2 are radially helical to obtain, in this case, uniform and controlled distribution of the metallic filaments and ventilation of the brushed surface. FIG. 5 shows a linear strip brush where the plastic support (brush body 2) which keeps the filaments 3 together is provided with the windows 10, which in this case serve to keep the filaments in place during the formation of the support and to make it possible to make strip brushes of any other shape without breaking (in this case, to use thermoplastic materials).

This binder material is a liquid plastic material which solidifies in suitable shapes around the position of the filaments 3 to incorporate them therein to form the brush body 2.

For example, the binder material may be polyurethane solidified in a suitable geometrical shape around the filaments 3 to form a rigid (but not brittle) block incorporating the filaments 3 and other components of the brush, if any, to hold them in place and to distribute the filaments according to specific requirements.

FIG. 6 schematically illustrates equipment for making the brush 1, that is to say, a mould 6 for making brushes (in this case, cup brushes), and showing the inserts 13 suitably positioned to obtain the windows 10 and thus to produce the brush body 2 as described in the foregoing.

The inserts 13 used in the casting or injection mould 6 in this specific case are used on the first part of the cup brush.

In a variant embodiment of the invention not illustrated, the brush body might not comprise a threaded metallic reducer and therefore it might be added during the process of forming the retaining portion 5 of binder material.

It should be noted that this invention is described herein as embodied in cup and circular brushes but can also be embodied in the form of any other type of brush or tool similar to those described, that is, comprising filaments anchored to a brush body designed to be set in rotation about its axis in order to perform a mechanical process.

This invention also has for an object a process for making a brush 1, in particular the brush 1 described up to here.

According to the invention, this process comprises the following steps, in sequence:

preparing a mould 6 forming a moulding space (or chamber 6a) designed to receive a liquid;

mounting in the mould 6 the mechanical construction elements (or inserts 13) in such a way as to precisely clamp the metallic or synthetic filaments 3 and to produce suitable slots in the brush body 2;

placing the finished or semifinished brush with the filaments 3 in the moulding space;

introducing a binder material in the liquid state into the moulding space in such a way that the surface of the filaments 3 is partly or totally immersed in the binder material according to different or homogeneous densities;

solidifying the binder material to form a solid brush body 2 partly or totally incorporating the filaments 3 to form a brush 1 which the filaments 3 are anchored to.

As already mentioned, the binder material is preferably a plastic material with high elasticity and low brittleness.

More preferably, the binder material is a plastic material such as polyurethane, a thermoplastic or thermosetting material, an elastomer, a silicone or a natural rubber.

It should be noted that in cup or tapered brushes, the plurality of filaments 3 is positioned in such a way as to form an annular coil.

According to one aspect of the invention, the inserts 13 are anchored to a lateral wall of the chamber 6a to form a radial abutment outside the annular coil. Thus, the inserts 13 are positioned externally of the annular coil.

Alternatively, or in addition, the mould 6 may comprise a central pin 6b defining, in use, a channel for reducing the brush.

In that case, the annular coil is substantially coaxial with the pin 6b.

In one embodiment, the inserts 13 are anchored to the pin to form a radial abutment inside the annular coil. Thus, the inserts 13 are interposed between the pin 6b and the coil to form the windows 10 in a zone of the retaining portion inside the coil.

It should be noted that the step of introducing the liquid binder may be performed either by casting or by injection.

Advantageously, this is possible because the filaments 3 are positioned in such a way that the inserts 13 form a radial abutment for the first portion 3a of the filaments 3, allowing the binder material to be introduced by injection under pressure, thereby considerably increasing production capacity.

In effect, if the speed of injection is too high or too low, the inserts 13 in the mould 6 allow reducing the risk of displacing the filaments 3 and their position relative to infeed of the material into the mould allows obtaining optimum pressure distribution, with the advantage of obtaining optimum penetration of the binder material.

The invention achieves the set aims and brings important advantages.

In effect, the presence of the inserts allows:

better positioning the filaments during the step of preparing the filaments and the subsequent step of introducing and solidifying the liquid plastic material, guaranteeing that the filaments remain in the correct position, centred relative to the axis of rotation;

producing a plurality of windows on the lateral surface of the brush body allowing the metal components forming part of the brush 1 to come into contact with the air; for example, for convenience of use, there may be an outer ring which keeps within it a group of metallic filaments which may be embedded in the binder material only for the part where the ring is.

These windows increase the heat exchange surface area of the brush body and heat exchange is improved also thanks to the thinner or total absence of the plastic material in the windows formed in the brush body. These windows also serve to keep the filaments in place and make brush cooling particularly effective, also because they produce turbulent air motion on the outside surface of the brush body, thereby improving heat exchange by convection.

The inserts are used particularly in injection moulding of the brush body to keep the filaments in place while the liquid plastic material is introduced and they are positioned to optimize the distribution of the high moulding pressure inside the mould cavity, thereby also allowing less plastic material to be used.

It should be noted that the steps of preparing the brush components and of introducing the liquid plastic material are not necessarily sequential and, in a variant embodiment of the invention, the step of introducing the liquid plastic may precede the step of preparing the brush components.

The step of solidifying the liquid plastic material, on the other hand, necessarily follows the steps of preparing the brush components and introducing the liquid plastic material.

The brush is thus particularly simple to make and robust, since the presence of the solidified plastic binder material of suitable shape, partly or totally incorporating the filaments, overcomes existing problems and at the same time allows considerable savings in plastic material and hence also reducing production costs (reduced injection times).

These shapes also allow improved brush balance because the fillings may have greater filament concentrations in certain zones of the brush and the properties of the brush remain unaltered during their use.

These shapes also allow improved processing, for example with strip brushes, with perfect filament distribution and the possibility of constructing supports (brush bodies) and filament distributions having geometrical shapes such as to prevent the risk of breakage.

The invention claimed is:

1. A tool for mechanical processing, comprising:
   a main body (2);
   a plurality of filaments (3) having a first portion (3a) anchored to the main body (2) and a second portion (3b) designed to apply a brushing action when the body (2) is rotated about a relative axis (4) or translated, wherein the body (2) comprises a retaining portion (5) made from a binder material in which the first portion (3a) of the filaments (3) is embedded and incorporated to make it integral with the body (2); the retaining portion (5) defining the shape of the main body (2); characterized in that the retaining portion (5) is equipped with a plurality of windows (10) designed to improve the heat exchange of the first portion (3a) of the filaments (3) with the environment during the rotation of the brush at high speeds so as to reduce the temperature, wherein the windows (10) are pass-through so as to put into communication the filaments (3) and/or components inside the main body (2) with the outside environment, and wherein the first portion (3a) of the filaments (3) partly faces outside the main body (2) through the plurality of windows (10); and further comprising a ring (12) positioned around the first portion (3a) of the filaments (3) for locking them and incorporated in the retaining portion (5); the ring (12) partly facing outside the main body (2) through the plurality of windows (10).

2. The tool according to claim 1, wherein the retaining portion (5) extends along the second portion (3b) of the filaments (3) to incorporate it and has one or more further pass-through windows (10) positioned in such a way as to make the second portion (3b) of the filaments (3) accessible from the outside so as to improve the heat exchange during rotation of the tool at high speeds.

3. The tool according to claim 2, wherein the further pass-through window (10) extends in helical fashion starting from a free end of the second portion (3b) of the filaments (3) towards the main body (2).

4. The tool according to claim 1, wherein the filaments (3) embedded in the retaining portion (5) are of the synthetic type with abrasive powder.

5. A process for making a tool (1) for mechanical processes, comprising the follow steps:

preparing a mould (6) forming a moulding chamber (6a) designed to receive a liquid;
   preparing a plurality of filaments (3) positioned in such a way that at least a first portion (3a) of the filaments (3) is positioned in the moulding chamber (6a) in such a way as to define an annular coil;
   introducing in the chamber a binder material in the liquid phase by injecting under pressure, in such a way that at least the first portion (3a) of the filaments (3) is immersed in the binder material;
   solidifying the binder material to form a retaining portion (5) encapsulating at least the first portion (3a) of the filaments (3) and thereby constituting a rigid main body (2) in which the first portion (3a) of the filaments (3) is embedded; wherein the step of preparing a mould (6) comprises at least a step for preparing a plurality of inserts (13) anchored to a lateral wall of the chamber (6a) to form a radial abutment outside the annular coil; and configured for defining, at the end of the solidifying step, a corresponding plurality of windows (10) designed to improve the heat exchange of the first portion (3a) of the filaments (3) with the environment during the rotation of the brush at high speeds so as to reduce the temperature, wherein the step of preparing a plurality of filaments (3) is performed by positioning the first portion (3a) of the filaments (3) at least partly in contact with the inserts (13) in such a way that the inserts define a radial abutment for the first portion (3a) of the filaments (3).

6. The process according to claim 5, wherein it comprises a step, before the introducing step, of preparing a ring (12) positioned in the chamber (6a) inside the first portion (3a) of the filaments (3) for locking them; the inserts (13) abutting on the ring (12) so as to form, at the end of the solidifying step, the plurality of pass-through windows (10) which make the ring (12) visible from the outside so as to improve the heat exchange during rotation of the brush (1).

7. The process according to claim 5, wherein the mould (6) comprises a central pin (6b) and the plurality of filaments (3) is positioned in such a way as to define an annular coil substantially coaxial with the pin (6b); the inserts (13) being anchored to the pin (6b) to form a radial abutment inside the annular coil.

* * * * *